3,463,816
PROCESS FOR PREPARING BISAMINOALKYL SULFIDES
George F. Button, Lake Jackson, and David L. Childress, Angleton, Tex., assignors to The Dow Chemical Company, Midland, Mich, a corporation of Delaware
No Drawing. Filed Jan. 3, 1967, Ser. No. 606,536
Int. Cl. C07c 149/24
U.S. Cl. 260—583       7 Claims

ABSTRACT OF THE DISCLOSURE

Bisaminoalkyl sulfides (e.g., bis(2-aminoethyl) sulfide) are prepared in a two-step process by adding hydrogen sulfide to an alkylenimine (e.g., ethylenimine) until the resulting exotherm subsides and then adding the same or a different alkylenimine to the intermediate thus formed.

Field of the invention

The present invention relates to a novel process for preparing bisaminoalkyl sulfides wherein substantially complete conversion of alkylenimines to bisaminoalkyl sulfides may be obtained. More particularly, it relates to a novel process wherein hydrogen sulfide is added to an alkylenimine until the resulting exothermic reaction subsides, and then an alkylenimine is added to the reaction product obtained, preferably until an excess of unreacted alkylenimine is present in the reaction mixture. The process of this invention usually gives conversions of 90 percent or higher of alkylenimine to bisaminoalkyl sulfide having a 99 weight percent or higher purity.

Description of the prior art

The preparation of bisaminoalkyl sulfides from alkylenimines and hydrogen sulfide is known in the art. For example, Nathan et al., J.A.C.S., 63, 2361 (1941) report a yield of about 50 percent of bis(2-aminoethyl) sulfide by passing hydrogen sulfide into ethylenimine at 60° C., dissolving the reaction product in ethyl alcohol, cooling overnight, and distilling bis(2-aminoethyl) sulfide from the mixture.

Summary of the invention

It has now been discovered that substantially complete conversion of alkylenimines to bisaminoalkyl sulfides may be accomplished with hydrogen sulfide according to essentially a two-step reaction process. The first step consists of adding hydrogen sulfide to the alkylenimine until the exotherm subsides, i.e., until the resulting reaction subsides. At this stage, the principal reaction product is a mercaptoalkyl amine. The second step consists of adding either the same alkylenimine or a different alkylenimine to the intermediate reaction product. If the same alkylenimine is used in both the first and second step, a symmetrical bisaminoalkyl sulfide results. Conversely, if a different alkylenimine is employed, an unsymmetrical bisaminoalkyl sulfide may be prepared. For optimum yield, the addition of alkylenimine is carried out in the second step until a slight excess of unreacted alkylenimine is detected in the reaction mixture. The process of the present invention may be carried out either in the absence of a solvent or in the presence of an inert (and desirably polar) solvent.

Detailed description of the invention

Operable alkylenimines for the process of this invention may be represented by the formula:

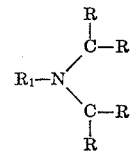

wherein R is, independently in each case, hydrogen or an alkyl group having from 1 to 4 carbon atoms and $R_1$ is hydrogen or an alkyl, aryl, alkaryl, aralkyl, cycloalkyl, or a halo-, nitro-, cyano-, amino-, or hydroxyl-substituted alkyl, aryl, aralkyl, alkaryl, or cycloalkyl group containing from about 1 to about 20 carbon atoms. Thus, in the above formula R may be hydrogen, methyl, ethyl, n-propyl, iso-propyl, n-butyl, iso-butyl, sec.-butyl, or tert.-butyl. $R_1$ may be hydrogen, methyl, ethyl, propyl, phenyl, phenethyl, ethylphenyl, cyclohexyl, chloroethyl, chlorophenyl, nitroethyl, nitrophenyl, cyanoethyl, aminoethyl, hydroxyethyl or the like. As indicated by the general formula above, the alkylenimines may contain substituents on both the nitrogen and the carbon atoms. The preferred alkylenimines for the process of this invention are ethylenimine and those substituted alkylenimines wherein R is hydrogen or methyl and $R_1$ is hydrogen, an alkyl group, or a substituted alkyl group containing from 1 to 4 carbon atoms.

If it is desired to use a solvent, an inert (and desirably polar) solvent should be employed. As used herein, the term "inert solvent" refers to those materials in which the alkylenimines are soluble or dispersible and with which the alkylenimines and the hydrogen sulfide are non-reactive under the conditions employed herein. Suitable specific examples of such solvents include the alcohols containing from 1 to 4 carbon atoms, such as methyl alcohol, ethyl alcohol, isopropyl alcohol, and the like, the glycol ethers, such as ethylene glycol methyl ether, ethylene glycol ethyl ether, diethylene glycol methyl ether, diethylene glycol ethyl ether, propylene glycol methyl ether, dipropylene glycol methyl ether, tripropylene glycol methyl ether, mixtures thereof, and the like. Preferably, the process of the present invention is carried out in the absence of a solvent or in the presence of ethyl alcohol.

The process of the present invention may be carried out at temperatures between about 20° and about 100° C. The preferred temperature range is from about 50° to about 75° C. The process is normally carried out at atmospheric pressure, although increased pressure may be used to increase the reaction rate. The reaction time depends on the temperature employed and the nature of the alkylenimine used. For the first step in the process, times of from about one hour to about three hours have been found advantageous. For the second step, times of from about two hours to about three hours have been found advantageous.

This process can be performed in a continuous reactor, such as a coil reactor, with high efficiency. Reaction times are substantially reduced in coil reactors, wherein there is good heat transfer to remove the heat of reaction efficiently.

The bisaminoalkyl sulfides of the present invention are useful primarily as vulcanization accelerators for rubber and as intermediates for the preparation of other organic sulfur compounds.

Description of the preferred embodiments

The following examples describe completely representative specific embodiments and preferred modes contemplated by the inventors for practicing the invention claimed. The scope of the invention is limited only by the claims appended hereto.

Example 1

Into a reaction vessel equipped with means for stirring, purging, refluxing, reactant addition, and temperature control is placed 832 g. of ethylenimine. The temperature of the ethylenimine is maintained between 60 and 65° C., and hydrogen sulfide is bubbled into the ethylenimine until the exotherm subsides. After about 150 minutes, the exothermic reaction ceases, and ethylenimine is then added until a slight excess remains unreacted. The presence of such a slight excess is determined by following the reaction with vapor phase chromatography. The unreacted ethylenimine is removed under reduced pressure at a temperature of 100° C. The remainder of the reaction mixture is determined to be bis(2-aminoethyl)-sulfide by vapor phase chromatography and mercaptan titration for mercaptoethyl amine. A total yield of 1,603.7 g. of bis(2-aminoethyl)sulfide is obtained, which represents a 93.8 percent yield of 99 percent by weight purity product.

Example 2

In reactions performed substantially as in Example 1 with the use of other imine reactants, the following typical reaction products may be obtained:

| Reactant with H₂S | Product obtained in high yield |
|---|---|
| 2-methyl ethylenimine | bis(2-aminopropyl)sulfide |
| 1-methyl ethylenimine | CH₃NHCH₂CH₂SCH₂CH₂NHCH₃ |
| 1,2-dimethyl ethylenimine | CH₃NHCH₂CH₂CH₂SCH₂CH₂CH₂NHCH₃ |
| 1,2,3-trimethyl ethylenimine | CH₃NHCH(CH₃)CH₂CH₂SCH₂CH(CH₃)NHCH₃ |

Substitution of other imine reactants, as described previously, gives similar products.

Example 3

In experiments wherein the first step of the process is performed with a given imine and the second step is performed with a different imine, a mixture of products is obtained.

Thus, in the reaction of ethylenimine with H₂S at about 60° C., performed by bubbling the H₂S into the ethylenimine until the exotherm subsides, followed by the addition of propylenimine until a slight excess of propylenimine remains unreacted, the excess being then removed under reduced pressure at about 90–100° C., one obtains a reaction product mixture containing nominally from about 60 to 80% by weight of bis(2-aminoethyl)-sulfide and about 20 to 40% by weight aminoethyl, 2-aminopropyl thioether $$(NH_2CH_2CH_2SCH_2CH(NH_2)CH_3)$$

What is claimed is:
1. The process for preparing bisaminoalkyl sulfides which comprises
   (1) adding hydrogen sulfide to an alkylenimine having the formula:

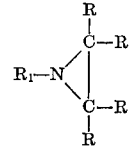

wherein each R is independently hydrogen or an alkyl group having from 1 to 4 carbon atoms and $R_1$ is hydrogen or alkyl, phenyl, alkylphenyl, phenylalkyl, cycloalkyl, or a halo-, nitro-, amino-, or hydroxyl-substituted alkyl, phenyl, phenylalkyl, alkylphenyl, or cycloalkyl group such that the $R_1$ moiety contains no more than 20 carbon atoms, until the resulting exothermic reaction subsides, and
   (2) adding an alkylenimine having the formula above to the product obtained from the first step.

2. The process of claim 1 wherein R is hydrogen or methyl and $R_1$ is hydrogen, methyl, ethyl, chloroethyl, hydroxyethyl, aminoethyl, phenethyl, or cyclohexyl.

3. The process of claim 1 wherein R and $R_1$ are hydrogen or methyl.

4. The process of claim 1 wherein R and $R_1$ are hydrogen.

5. The process of claim 1 wherein, after the exotherm subsides, the alkylenimine is added to the product thus obtained until a slight excess of unreacated alkylenimine exists in the reaction mixture.

6. The process of claim 5 wherein R is hydrogen or methyl, $R_1$ is hydrogen, methyl, ethyl, chloroethyl, hydroxyethyl, aminoethyl, phenethyl, or cyclohexyl.

7. The process of claim 5 wherein R and $R_1$ are hydrogen.

References Cited

UNITED STATES PATENTS 2,304,623  12/1942  Berchet.

FLOYD D. HIGEL, Primary Examiner
R. L. RAYMOND, Assistant Examiner

U.S. Cl. X.R.
260—239, 465, 465.5, 563, 570.5, 584